(12) United States Patent
Fukuhara

(10) Patent No.: US 8,420,240 B2
(45) Date of Patent: Apr. 16, 2013

(54) METHOD FOR CONTROLLING SODIUM-SULFUR BATTERIES

(75) Inventor: Motohiro Fukuhara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/039,709

(22) Filed: Mar. 3, 2011

(65) Prior Publication Data
US 2011/0206954 A1 Aug. 25, 2011

Related U.S. Application Data

(63) Continuation of application No. PCT/JP2009/066610, filed on Sep. 25, 2009.

(60) Provisional application No. 61/101,166, filed on Sep. 30, 2008.

(51) Int. Cl.
H01M 10/42 (2006.01)

(52) U.S. Cl.
USPC .......... 429/50; 307/43; 307/46; 307/66; 307/80; 307/81; 307/85; 307/86; 307/87; 320/119; 320/121; 320/135; 320/136

(58) Field of Classification Search ............ 307/19, 307/21, 23, 29, 44, 46, 50, 85–87, 43, 66, 307/80, 81; 429/50; 320/119, 121, 135, 320/136
See application file for complete search history.

(56) References Cited

U.S. PATENT DOCUMENTS

| 6,487,096 | B1 * | 11/2002 | Gilbreth et al. ................. 363/35 |
| 6,563,234 | B2 * | 5/2003 | Hasegawa et al. ............. 307/66 |
| 6,577,103 | B2 * | 6/2003 | Tanaka et al. ................. 320/116 |
| 2005/0248316 | A1 * | 11/2005 | Kangas et al. ................. 320/132 |
| 2006/0208570 | A1 * | 9/2006 | Christian et al. ............. 307/10.1 |
| 2007/0052295 | A1 * | 3/2007 | Frucht ............................. 307/66 |
| 2007/0080666 | A1 * | 4/2007 | Ritter et al. ................... 320/128 |
| 2007/0246943 | A1 * | 10/2007 | Chang et al. .................... 290/44 |
| 2008/0076010 | A1 * | 3/2008 | Sato ............................... 429/61 |
| 2008/0179887 | A1 * | 7/2008 | Kawazoe et al. ............... 290/44 |
| 2008/0224541 | A1 * | 9/2008 | Fukuhara ....................... 307/48 |

FOREIGN PATENT DOCUMENTS

| JP | 2003-111301 A1 | 4/2003 |
| JP | 2006-287998 | 10/2006 |
| JP | 2006-339077 A1 | 12/2006 |
| JP | 2008-084677 A1 | 4/2008 |
| JP | 2008-104284 | * 5/2008 |

OTHER PUBLICATIONS

U.S. Appl. No. 13/038,609, filed Mar. 2, 2011, Fukuhara, Motohiro.
U.S. Appl. No. 13/038,618, filed Mar. 2, 2011, Fukuhara, Motohiro.
Extended European Search Report, European Patent Application No. 09817696.9, dated Jun. 13, 2012 (6 pages).

* cited by examiner

*Primary Examiner* — Ula C Ruddock
*Assistant Examiner* — Amanda Barrow
(74) *Attorney, Agent, or Firm* — Burr & Brown

(57) ABSTRACT

When charge power or discharge power of each individual sodium-sulfur battery included in a plurality of sodium-sulfur batteries becomes 1/n (n is a natural number) or less of a rated output, individual sodium-sulfur batteries are sequentially stopped. This prevents the discharge power (or the charge power) of the sodium-sulfur battery from becoming minute, so that a battery depth (or a stored energy) of the sodium-sulfur battery can be accurately managed.

9 Claims, 3 Drawing Sheets

METHOD FOR CONTROLLING SODIUM-SULFUR BATTERIES

FIELD OF THE INVENTION

The present invention relates to a method for controlling sodium-sulfur batteries, in an interconnected system in which a power generation device that fluctuates in output, such as a wind power generation device, and an electric power storage-compensation device that includes a plurality of sodium-sulfur batteries are combined to supply power to an electric power system.

BACKGROUND OF THE INVENTION

In recent years, a renewable energy power generation device for generating electric power from wind power, solar photovoltaic energy, geothermal energy, or the like has attracted attention and been put to practical use. The renewable energy power generation device is a clean power generation device that does not use any limited resource such as oil but uses an energy resource present in unlimited quantity in nature, and can suppress carbon dioxide emissions. Hence, the renewable energy power generation device has been increasingly introduced by companies, governments, and the like, for prevention of global warming.

However, since energy coming from nature varies from moment to moment, output fluctuations are unavoidable in the renewable energy power generation device. This poses an obstacle to widespread use of the renewable energy power generation device. To remove this obstacle, in the case of employing the renewable energy power generation device, it is preferable to build an interconnected (power generation) system that combines the renewable energy power generation device with an electric power storage-compensation device having a plurality of sodium-sulfur batteries (secondary batteries) as a main component.

A sodium-sulfur battery has features such as a high energy density, an ability to produce high output in a short time, and an excellent high-speed response. Accordingly, when a bidirectional converter for controlling charge and discharge is added, the sodium-sulfur battery offers an advantage that output fluctuations of the renewable energy power generation device which can occur on the order of several hundred milliseconds to several seconds can be compensated. Therefore, the interconnected system in which the renewable energy power generation device is combined with the electric power storage-compensation device having the plurality of sodium-sulfur batteries as the component is a desirable power generation system.

SUMMARY OF THE INVENTION

Conventionally, in the electric power storage-compensation device having the plurality of sodium-sulfur batteries as the component, normally the control of charge and discharge of the plurality of sodium-sulfur batteries is collectively performed because of its simplicity. A battery depth (a depth of discharge, (%)) of each individual sodium-sulfur battery is managed by inputting a current value required for charge/discharge of the sodium-sulfur battery into a control device such as a sequencer, performing, from an initially set stored energy (Ah), addition/subtraction of the current value (e.g., addition in the case of charge and subtraction in the case of discharge, or otherwise) and integration, and converting to a capacity ratio. Note that, if the battery depth can be accurately managed, then the stored energy (remaining capacity) can be known, too. Accordingly, the battery depth can be translated to the stored energy in this specification.

The interconnected system in which the renewable energy power generation device is combined with the electric power storage-compensation device having the plurality of sodium-sulfur batteries as the component functions to compensate for fluctuations of the renewable energy power generation device, in order to achieve a smooth or completely flat output (as the interconnected system) according to a power generation plan designated by a human, a computer, or the like. This being so, in the case where a power generation planned value (operation planned value) of the interconnected system and generated power (output) of the renewable energy power generation device approach each other, power compensated (absorbed) by the electric power storage-compensation device having the plurality of sodium-sulfur batteries as the component may become slight. In such a case, discharge power (or charge power) of a sodium-sulfur battery becomes minute.

When the discharge power (or the charge power) of the sodium-sulfur battery becomes minute, the current required for discharge (or charge) becomes minute, too. This raises a possibility of entering a dead zone where discharge (or charge) cannot be recognized based on such a minute current (e.g. a current not more than 30 A). That is, even when the sodium-sulfur battery is actually performing discharge (or charge), the discharge (or the charge) cannot be recognized, as a result of which the current value required for discharge (charge) is not input in the control device such as the sequencer and the above-mentioned battery depth integration update is not performed. This causes an error between an actual battery depth and a management value managed by the control device. When a state in which the discharge power (or the charge power) of the sodium-sulfur battery is minute continues longer, the error is integrated and as a result increases.

If the error between the actual battery depth and the management value increases in each sodium-sulfur battery, an accurate battery depth cannot be specified. This can induce a problem that the sodium-sulfur battery suddenly reaches a charge end and becomes unable to continue charge or suddenly reaches a discharge end and becomes unable to continue discharge, and stops in the middle of compensating for output fluctuations of the renewable energy power generation device.

The present invention has been made in view of such circumstances, and has an object of providing a means for, in an interconnected system combining a renewable energy power generation device that fluctuates in output and an electric power storage-compensation device that has a plurality of sodium-sulfur batteries as a component, accurately managing a battery depth (or a stored energy) of each of the sodium-sulfur batteries. As a result of repeated studies, it has been found that the problem stated above can be solved by sequentially stopping, when discharge power (or charge power) of each individual sodium-sulfur battery decreases to a certain level or less, sodium-sulfur batteries specified based on predetermined priority order, and then restarting the sodium-sulfur batteries. In detail, the following means is provided according to the present invention.

That is, according to the present invention, there is provided a method for controlling a plurality of sodium-sulfur batteries that, in an interconnected system in which a power generation device that fluctuates in output and an electric power storage-compensation device are combined to supply power to an electric power system, are each included in the electric power storage-compensation device and compensate for output fluctuations of the power generation device, the method including: sequentially stopping the individual sodium-suffer batteries when charge power or discharge power of each individual sodium-sulfur battery included in the plurality of sodium-sulfur batteries becomes (decreases to) 1/n or less of a rated output, n being a natural number; and sequentially restarting the individual sodium-sulfur batteries when the charge power or the discharge power of each individual sodium-sulfur battery becomes (returns to) x % or more of the rated output, x being a natural number.

In the sodium-sulfur battery control method according to the present invention, it is preferable that 1/n is not less than ⅛ (12.5%) and not more than ½ (50%). Particularly preferable 1/n is ¼ (25%). That is, it is preferable to sequentially stop the individual sodium-sulfur batteries when the charge power or the discharge power of each sodium-sulfur battery decreases to ¼ or less of the rated output.

In the sodium-sulfur battery control method according to the present invention, it is preferable that x is not less than 80 and not more than 100. Particularly preferable x is 100. That is, it is preferable to sequentially restart the individual sodium-sulfur batteries when the charge power or the discharge power of each sodium-sulfur battery returns to the rated output.

In the sodium-sulfur battery control method according to the present invention, it is preferable that priority order for stopping the individual sodium-sulfur batteries is determined beforehand, and a priority of a sodium-sulfur battery that is stopped first is subsequently decreased to lowest.

As restart order, it is preferable to restart the sodium-sulfur batteries in order of increasing priority, based on the predetermined priority order. This means first-in, last-out.

"Subsequently" denotes after one cycle of stopping and restarting the individual sodium-sulfur batteries is completed. For example, suppose there are four sodium-sulfur batteries No. 1 to No. 4. Priorities are given in order of No. 1, No. 2, No. 3, and No. 4. After No. 1 is stopped first and restarted last, then the priority of No. 1 is decreased to lowest, setting the priority order as No. 2, No. 3, No. 4, and No. 1. Further, after No. 2 is stopped first and restarted last, then the priority of No. 2 is decreased to lowest, setting the priority order as No. 3, No. 4, No. 1, and No. 2. After No. 3 is stopped first and restarted last, then the priority of No. 3 is decreased to lowest, setting the priority order as No. 4, No. 1, No. 2, and No. 3. After No. 4 is stopped first and restarted last, then the priority of No. 4 is decreased to lowest, setting the priority order as No. 1, No. 2, No. 3, and No. 4 which is the original order. This process is repeated.

The sodium-sulfur battery control method according to the present invention is particularly suitable when the power generation device that fluctuates in output is a renewable energy power generation device that uses renewable energy of at least one of wind power, solar photovoltaic energy (sunlight energy), and geothermal energy (geothermal heat).

The number of sodium-sulfur batteries stopped simultaneously may be more than one. In this case, there are two or more sodium-sulfur batteries of the same priority. However, the number of sodium-sulfur batteries stopped simultaneously is preferably one. It is preferable to stop the sodium-sulfur batteries one by one.

The sodium-sulfur battery control method according to the present invention is a method for controlling a plurality of sodium-sulfur batteries that, in an interconnected system in which a power generation device that fluctuates in output and an electric power storage-compensation device are combined to supply power to an electric power system, are each included in the electric power storage-compensation device.

In this specification, an individual (one) sodium-sulfur battery constituting the plurality of sodium-sulfur batteries denotes a sodium-sulfur battery that is separated from other sodium-sulfur batteries in unit of control, and is not determined by the number of cells, the number of module batteries, an output magnitude, and the like. In detail, in the case where a sodium-sulfur battery composes the electric power storage-compensation device, a sodium-sulfur battery under control of one bidirectional converter is treated as one sodium-sulfur battery (though a plurality of sodium-sulfur batteries 3 are shown in each of No. 1 to No. n in FIG. 1 described later, an expression such as "No. 1 sodium-sulfur battery 3" is used to treat the plurality of sodium-sulfur batteries 3 as one No. 1 sodium-sulfur battery 3). It is desirable that all sodium-sulfur batteries have the same rated capacity, though the rated capacity need not necessarily be the same.

In the sodium-sulfur battery control method according to the present invention, when the charge power or the discharge power of each individual sodium-sulfur battery included in the plurality of sodium-sulfur batteries becomes 1/n or less of the rated output, the individual sodium-sulfur batteries are sequentially stopped. Accordingly, there is always a large deviation between the generated power (output) of the interconnected system and the generated power (output) of the power generation device (renewable energy power generation device) that fluctuates in output. Therefore, charge power or discharge power of a sodium-sulfur battery other than the stopped sodium-sulfur batteries does not become minute. Thus, there is no possibility that the current of the operating sodium-sulfur battery enters the dead zone where charge or discharge cannot be recognized. The current value required for charge or discharge is reliably input in the control device such as the sequencer, and battery depth integration update is properly performed. No error occurs between the actual battery depth and the management value managed by the control device.

If no error occurs between the actual battery depth and the management value in all of the plurality of sodium-sulfur batteries by the sodium-sulfur battery control method according to the present invention, the problem that the sodium-sulfur battery (electric power storage-compensation device) stops in the middle of compensating for output fluctuations of the renewable energy power generation device is unlikely to take place. Hence, output fluctuations of the renewable energy power generation device can be continuously compensated over a long period of time, by the electric power storage-compensation device that uses the sodium-sulfur batteries controlled by the sodium-sulfur battery control method according to the present invention. This contributes to significantly improved reliability of the interconnected system in prolonged operation.

As described above, in the sodium-sulfur battery control method according to the present invention, after stopping the individual sodium-sulfur batteries, the individual sodium-sulfur batteries are sequentially restarted when the charge power or the discharge power of each individual sodium-sulfur battery becomes x % or more of the rated output. In this way, even when the generated power of the power generation device (renewable energy power generation device) that fluctuates in output varies and increases in deviation from the power generation planned value (operation planned value) of the interconnected system, fluctuations of the renewable energy power generation device are suppressed to achieve a smooth or flat output as the interconnected system, without a loss of the charge power or the discharge power of the sodium-sulfur battery.

The sodium-sulfur battery control method according to the present invention can be utilized as a method for controlling, in an interconnected system in which a power generation device that uses renewable energy such as wind power, solar photovoltaic energy, geothermal energy, or the like and fluctuates in output and an electric power storage-compensation device are combined to supply power to an electric power system, a plurality of sodium-sulfur batteries included in the electric power storage-compensation device.

DETAILED DESCRIPTION OF THE INVENTION

Figure 1:
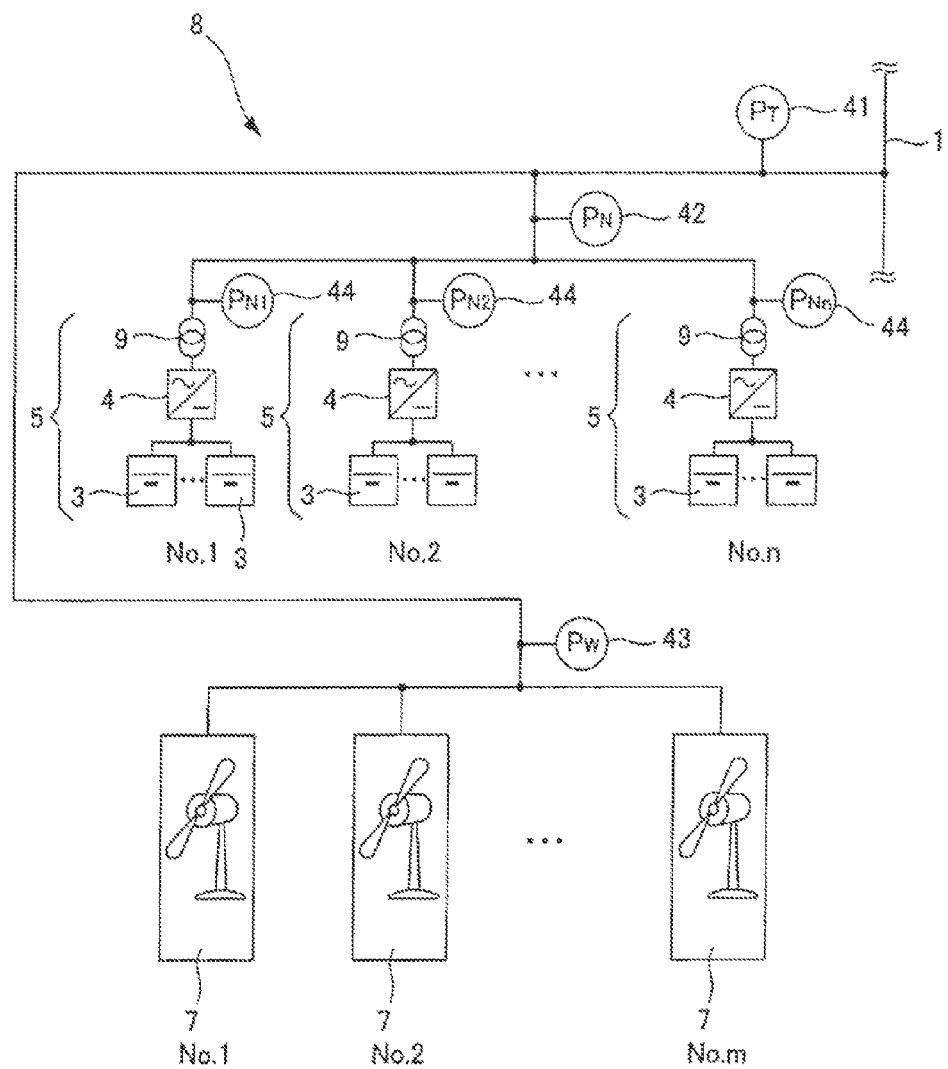
FIG. 1 is a system configuration diagram showing an example of an interconnected system including a power generation device that fluctuates in output and an electric power storage-compensation device.

The following describes an embodiment of the present invention, with reference to drawings according to need. It is to be understood that the present invention is not limited to the embodiment, and various changes, modifications, improvements, and replacements may be made on the basis of knowledge of a person skilled in the art without departing from the scope of the present invention. For example, though the drawings represent a preferred embodiment of the present invention, the present invention is not limited to the mode and information shown in the drawings. In order to implement or verify the present invention, means identical or equivalent to those described in this specification may be applied, and means described below are preferred means.

An interconnected system is described first. A system configuration diagram shown in FIG. 1 represents an example of an interconnected system including a power generation device that fluctuates in output and an electric power storage-compensation device. An interconnected system 8 shown in FIG. 1 includes a wind power generation device 7 (renewable energy power generation device) that turns a power generator by converting wind power into windmill rotation, and an electric power storage-compensation device 5. The electric power storage-compensation device 5 includes a sodium-sulfur battery 3 (also written as a NAS battery) which is a secondary battery capable of storing and outputting power, a bidirectional converter 4 having a dc/ac conversion function, and a transformer 9. For example, the bidirectional converter 4 may be composed of a chopper and an inverter, or composed of an inverter. The interconnected system 8 has m systems of the wind power generation device 7, i.e., No. 1 to No. m (m is an integer larger than 1) and n systems of the sodium-sulfur battery 3 (the electric power storage-compensation device 5), i.e., No. 1 to No. n (n is an integer larger than 1).

As mentioned earlier, sodium-sulfur batteries 3 included in one electric power storage-compensation device 5 are treated as one sodium-sulfur battery 3 as a whole. Moreover, a typical interconnected system includes a private power generator as a power generation device and a sodium-sulfur battery heater and other auxiliary machines as a load, but they are omitted in the interconnected system 8. In the sodium-sulfur battery control method according to the present invention, they can be regarded as being included (added or subtracted) in power generated by the power generation device (the wind power generation device 7) that fluctuates in output.

In the interconnected system 8, the sodium-sulfur battery 3 is discharged in the electric power storage-compensation device 5, and power $P_N$ measured by a power meter 42 compensates for output fluctuations of power (power $P_W$ measured by a power meter 43) generated by the wind power generation device 7. In detail, by controlling the discharge (i.e., power $P_N$) of the sodium-sulfur battery 3 so that power (power $P_T$ measured by a power meter 41) output from the interconnected system 8 as a whole satisfies "$P_T=P_W+P_N$=constant" ($P_N=P_T-P_W$), stable power of high quality is output as power $P_T$ from the whole interconnected system 8, and supplied, for example, to an electric power system 1 between a distributing substation and a consumer of electricity.

Moreover, in the interconnected system 8, the sodium-sulfur battery 3 is charged in the electric power storage-compensation device 5, in accordance with output fluctuations of power $P_W$ generated by the wind power generation device 7. In detail, by controlling the charge (i.e., power $-P_N$) of the sodium-sulfur battery 3 so that power $P_N$ measured by the power meter 42 is "$P_N=-P_W$", fluctuating power $P_W$ is consumed, as a result of which power $P_T$ output from the whole interconnected system 8 can be brought to 0.

In either of the case of charging the sodium-sulfur battery 3 and the case of discharging the sodium-sulfur battery 3, the sodium-sulfur battery 3 is charged or discharged by changing a control target value of the bidirectional converter 4 in the electric power storage-compensation device 5 based on the output (power $P_W$) of the wind power generation device 7 so that power for compensating for the output is input or output, thereby absorbing output fluctuations of the wind power generation device 7. Since stable power of high quality can be supplied by using the renewable energy power generation device (the wind power generation device 7) that emits almost no carbon dioxide and the sodium-sulfur battery 3 (the electric power storage-compensation device 5), the interconnected system 8 is a favorable power generation system.

Figure 2:
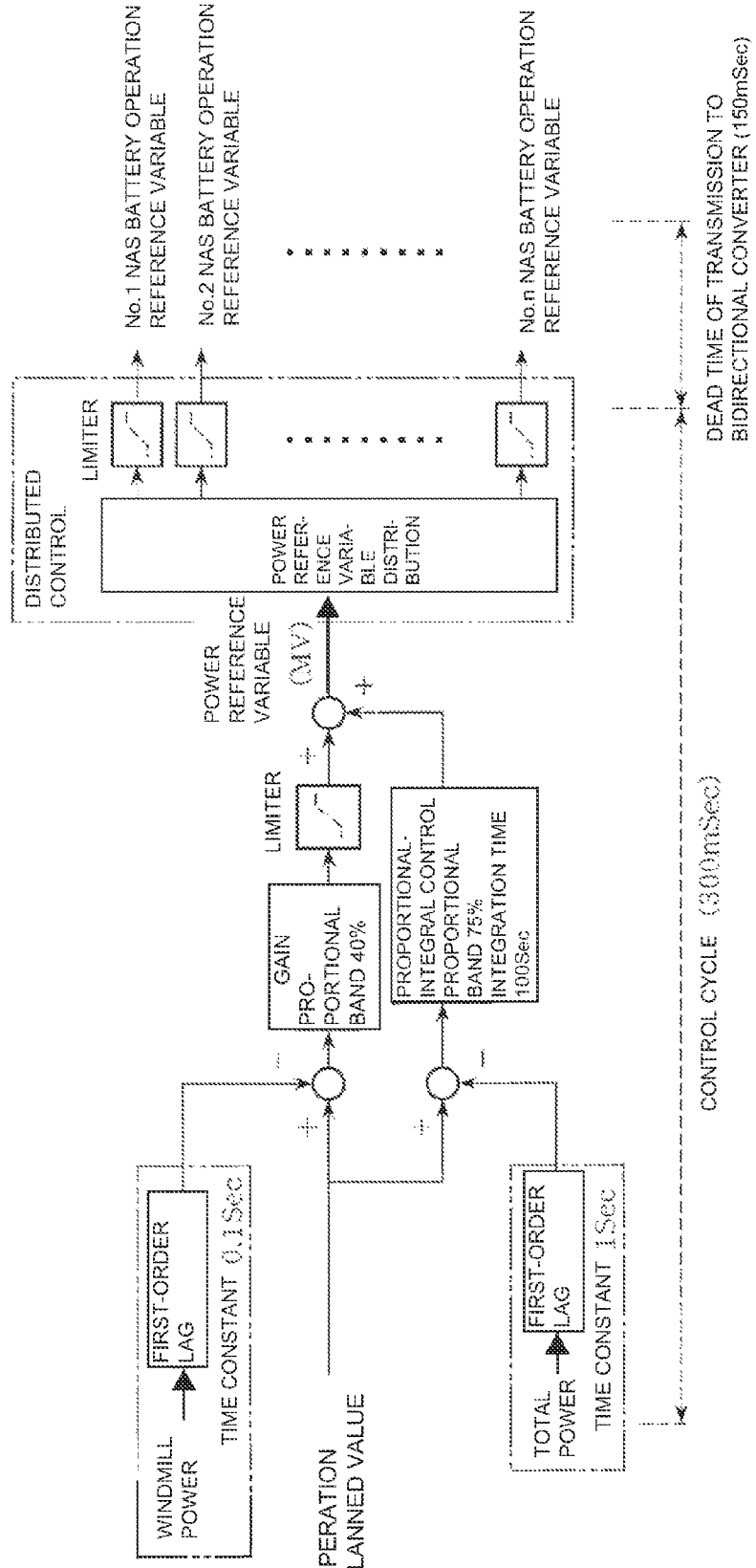
FIG. 2 is a block diagram showing a logic of determining an operation reference variable (manipulated variable) distributed to each sodium-sulfur battery in the interconnected system.
Figure 3:
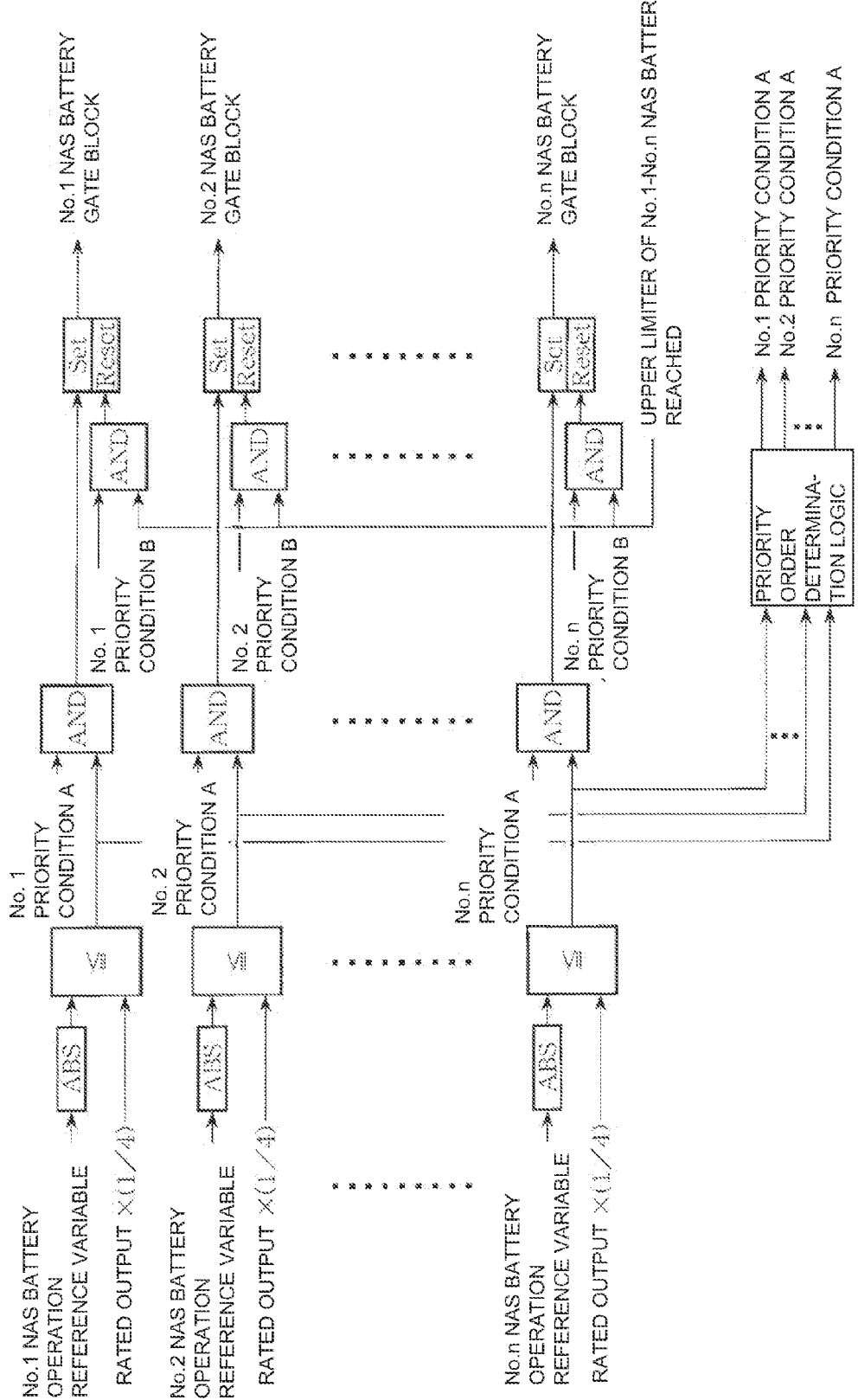
FIG. 3 is an example of a block diagram showing a logic of a sodium-sulfur battery control method, in the case where a power generation planned value and wind-generated power approach each other.

The following describes, with reference to FIGS. 2 and 3, control of the sodium-sulfur batteries 3 in the case where, in the interconnected system 8 shown in FIG. 1, the power generation planned value (operation planned value) of the interconnected system 8 and power $P_W$ of the wind power generation device 7 approach each other.

FIG. 2 is a block diagram showing a logic of determining an operation reference variable (manipulated variable (control quantity)) distributed to each sodium-sulfur battery 3 (No. 1 to No. n NAS battery) in the interconnected system 8. As shown in FIG. 2, a power reference variable (manipulated variable) can be calculated by adding the following two values: a value obtained as a result of proportional action and cutting of a set value or more by a limiter, based on a value obtained by subtracting windmill power (power $P_W$ generated by the wind power generation device 7) from the operation planned value; and a value obtained as a result of proportional action and integral action, based on a value obtained by subtracting total power (power $P_T$) at present (at the time of calculating the power reference variable) from the operation planned value. The power reference variable (reference quantity) is then distributed to each sodium-sulfur battery 3. Thus, an operation reference variable (manipulated variable) is given to each sodium-sulfur battery 3 (No. 1 to No. n NAS battery (unit) operation reference variable).

FIG. 3 is a block diagram showing a logic of the sodium-sulfur battery control method, in an example of the case where the power generation planned value and the wind-generated power approach each other. In FIG. 3, first, whether or not the operation reference variable is ¼ or less of the rated output is determined in FIG. 3). When the operation reference variable is ¼ (or less) of the rated output, then the priority is checked (AND operation with priority condition A in FIG. 3). When the sodium-sulfur battery has a higher priority, it is stopped first by a gate block (Set output to the NAS battery gate block in FIG. 3). An example priority order determination logic (with reference to FIG. 3) is a logic of checking the depth of discharge at 10 second intervals and stopping the sodium-sulfur batteries in order of increasing number from among (No. 1 to No. n) (output of No. 1 to No. n priority condition A). Alternatively, for instance when there are NAS batteries (units) of No. 1 to No. 15, No. 3 to No. 6 NAS batteries (units) may be stopped. Note that the NAS batteries to be stopped are not limited to NAS batteries (units) of consecutive numbers. A restart condition (recovery condition) is that the NAS battery (unit) reaches an upper limiter. When the condition is satisfied, the NAS batteries are sequentially restarted. This restart is preferably performed in such a manner that, as in the case of stop, the priority is checked (AND operation with priority condition B in FIG. 3 (priority condition B may be the same as or different from priority condition A (a priority order determination logic of determining priority condition B in the case where they are different is not shown in FIG. 3))) and the NAS batteries are sequentially restarted based on the priorities (Reset output to the NAS battery gate block in FIG. 3).

INDUSTRIAL APPLICABILITY

The present invention is suitably used as a method for controlling sodium-sulfur batteries, in an interconnected system in which a power generation device that fluctuates in output, such as a wind power generation device, and an electric power storage-compensation device that includes a plurality of sodium-sulfur batteries are combined to supply power to an electric power system.

DESCRIPTION OF REFERENCE NUMERALS

1: electric power system
3: sodium-sulfur battery
4: bidirectional converter
5: electric power storage-compensation device
7: wind power generation device
8: interconnected system
9: transformer
41, 42, 43, 44: power meter

The invention claimed is:

1. A method for controlling a plurality of sodium-sulfur batteries that, in an interconnected system in which a power generation device that fluctuates in output and an electric power storage-compensation device are combined to supply power to an electric power system, are each included in the electric power storage-compensation device and compensate for output fluctuations of the power generation device, the method comprising:

calculating a power reference variable by adding a first value obtained as a result of proportional action and cutting of a set value or more by a limiter, based on a value obtained by subtracting generated power of the power generation device that fluctuates in output from a power generation planned value of the interconnected system and a second value obtained as a result of proportional action and integral action, based on a value obtained by subtracting total power presently generated by the interconnected system from the power generation planned value of the interconnected system, and distributing the power reference variable to each individual sodium-sulfur battery included in the plurality of sodium-sulfur batteries as an operation reference variable;

sequentially stopping individual sodium-sulfur batteries when the charge power or discharge power of each individual sodium-sulfur battery becomes 1/n or less of a rated output, n being a natural number; and sequentially restarting the individual sodium-sulfur batteries when the charge power or discharge power of each individual sodium-sulfur battery becomes x % or more of the rated output, x being a natural number.

2. The method for controlling a plurality of sodium-sulfur batteries according to claim 1, wherein 1/n is not less than ⅛ and not more than ½.

3. The method for controlling a plurality of sodium-sulfur batteries according to claim 1, wherein x is not less than 80 and not more than 100.

4. The method for controlling a plurality of sodium-sulfur batteries according to claim 1, wherein priority order for stopping the individual sodium-sulfur batteries is determined beforehand, and a priority of a sodium-sulfur battery that is stopped first is subsequently decreased to lowest.

5. The method for controlling a plurality of sodium-sulfur batteries according to claim 1, wherein the power generation device that fluctuates in output is a renewable energy power generation device that uses renewable energy of at least one of wind power, solar photovoltaic energy, and geothermal energy.

6. The method for controlling a plurality of sodium-sulfur batteries according to claim 2, wherein priority order for stopping the individual sodium-sulfur batteries is determined beforehand, and a priority of a sodium-sulfur battery that is stopped first is subsequently decreased to lowest.

7. The method for controlling a plurality of sodium-sulfur batteries according to claim 3, wherein priority order for stopping the individual sodium-sulfur batteries is determined beforehand, and a priority of a sodium-sulfur battery that is stopped first is subsequently decreased to lowest.

8. The method for controlling a plurality of sodium-sulfur batteries according to claim 2, wherein the power generation device that fluctuates in output is a renewable energy power generation device that uses renewable energy of at least one of wind power, solar photovoltaic energy, and geothermal energy.

9. The method for controlling a plurality of sodium-sulfur batteries according to claim 3, wherein the power generation device that fluctuates in output is a renewable energy power generation device that uses renewable energy of at least one of wind power, solar photovoltaic energy, and geothermal energy.

* * * * *